United States Patent
Kanada (10) Patent No.: US 9,660,444 B2
(45) Date of Patent: May 23, 2017

(54) CONTROL UNIT FOR ROBOTS

(71) Applicant: DENSO WAVE INCORPORATED, Chita-gun, Aichi-pref. (JP)

(72) Inventor: Motoki Kanada, Kariya (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 123 days.

(21) Appl. No.: 14/226,918

(22) Filed: Mar. 27, 2014

(65) Prior Publication Data
US 2014/0292231 A1 Oct. 2, 2014

(30) Foreign Application Priority Data
Mar. 27, 2013 (JP) ................. 2013-066266

(51) Int. Cl.
G05B 19/19 (2006.01)
H02J 1/10 (2006.01)
H02P 23/20 (2016.01)

(52) U.S. Cl.
CPC ................ H02J 1/10 (2013.01); H02P 23/20 (2016.02)

(58) Field of Classification Search
CPC .................. G05B 19/4141; G05B 2219/33337
USPC .............................. 318/568.11, 568.12, 568.2
See application file for complete search history.

(56) References Cited

U.S. PATENT DOCUMENTS

| | | | | |
|---|---|---|---|---|
| 5,619,111 A * | 4/1997 | Katagiri | ................ | G05B 11/32 318/105 |
| 5,777,450 A * | 7/1998 | Kono | ................ | G05B 19/406 318/568.11 |
| 7,042,175 B2 * | 5/2006 | Watanabe | ............. | B25J 9/1674 318/34 |
| 8,030,878 B2 * | 10/2011 | Iwashita | ............... | G01R 31/42 318/779 |
| 8,099,193 B2 * | 1/2012 | Bird-Radolovic | ..... | B25J 9/1674 318/371 |
| 2004/0245951 A1 | 12/2004 | Yamada et al. | | |
| 2008/0013353 A1 | 1/2008 | Virolainen et al. | | |
| 2010/0192788 A1 * | 8/2010 | Tanaka | ................... | H02M 1/36 100/214 |
| 2012/0116581 A1 * | 5/2012 | Kwon | ............... | G05B 19/4067 700/245 |

FOREIGN PATENT DOCUMENTS

| | | |
|---|---|---|
| DE | 102009031257 A1 | 1/2011 |
| JP | H10248281 A | 9/1998 |
| JP | 2000-188897 A | 7/2000 |
| JP | A-2012-223881 | 11/2012 |

* cited by examiner

*Primary Examiner* — Rina Duda
(74) *Attorney, Agent, or Firm* — Oliff PLC

(57) ABSTRACT

In a control unit for a robot, an inverter which drives a motor installed in a robot. A control circuit controls drive of the motor. A drive power circuit supplies DC power to the motor, and a control power circuit DC power to the control circuit. A backup power circuit supplies backup DC power to the control circuit when the DC power from the control power circuit to the control circuit is shut down. A first switch is arranged between the backup power circuit and the inverter, the first switch being selectively switched on and off to open and close. A first switch control section switches on the first switch such that the DC power in the backup power circuit is supplementarily supplied to the inverter when the motor is driven to be accelerated.

10 Claims, 5 Drawing Sheets

CONTROL UNIT FOR ROBOTS

CROSS-REFERENCE TO RELATED APPLICATION

This application is based on and claims the benefit of priority from earlier Japanese Patent Application No. 2013-066266 filed Mar. 27, 2013, the description of which is incorporated herein by reference.

BACKGROUND OF THE INVENTION

Technical Field of the Invention

The present invention relates to a control unit for robots, and in particular, to a control unit for controlling speeds of industrial robots.

Related Art

As is well known, in a robot, a speed command is outputted from a control circuit and a motor is activated so as to follow the speed command (e.g., see JP-A-2012-223881). During an acceleration period in which the motor is accelerated, the actual speed of the motor is usually slightly different from the speed command value. That is, the actual speed is usually lower than the speed command value. This is attributed to the fact that electric power sufficient for meeting required torque is not supplied during the acceleration period, in spite of the fact that the required torque is increasing in the acceleration period. As a measure against this, a drive power circuit that supplies electric power for driving the motor may be designed such that the torque required in the acceleration period is constantly met. Such a design of the drive power circuit may lessen the difference of the actual speed of the motor from a speed command value to thereby enhance the follow-up performance of the motor.

However, when the drive power circuit is designed with reference to maximum torque required during the acceleration period, the power capacity of the circuit is required to be increased. Therefore, the size of circuit parts to be used is increased and accordingly the size of the control unit is increased. Further, when the power capacity is increased, power consumption of the driver power circuit itself is also increased. In practice, however, large torque is particularly required only in the acceleration period. In addition, in terms of a practical control cycle of a motor, the proportion of the acceleration period is comparatively small. When these matters are taken into account, designing a drive power circuit with reference to maximum torque may create a power-excessive state in most of the operation period of the robot including a suspension period when the motor is not driven, but for the acceleration period. At the same time, the increase in power consumption of the drive power circuit may constantly allow unnecessary power consumption (power loss). For these reasons, as it now stands, the departure of the actual speed of a motor from a speed command is tolerated because the departure raises no serious problem in terms of the specification of the robot. However, the follow-up performance of a motor is desired to be enhanced by reducing the difference of the actual speed of a motor from a speed command value. On the other hand, the size of the control unit and the occurrence of power loss are also desired to be reduced. In the conventional art, it is difficult to balance the enhancement of the follow-up performance of a motor, with the reduction in the size of the control unit and in the occurrence of power loss.

SUMMARY

Hence it is desired to provide a robot control unit that is able to enhance the follow-up performance of a motor, while achieving size reduction and suppressing the occurrence of power loss.

An exemplary embodiment provides a control unit for a robot. The control unit includes an inverter which drives a motor installed in a robot; a control circuit which controls drive of the motor; a drive power circuit which converts AC (alternating-current) power to DC (direct-current) power and supplies the converted DC power to the motor; a control power circuit which converts AC power to DC power and supplies the converted DC power to the control circuit: a backup power circuit which supplies backup DC power to the control circuit when the DC power from the control power circuit to the control circuit is shut down, wherein the backup power circuit is charged, at least, before the DC power to the control circuit is shut down; a switch circuit provided with a first switch arranged in a path electrically connecting the backup power circuit and the inverter, the first switch being selectively switched on and off to open and close; and a first switch control section which switches on the first switch to close the path such that the DC power in the backup power circuit is supplementarily supplied to the inverter when the motor is driven to be accelerated.

Thus, when the motor is driven to be accelerated, the first switch is closed to supplementarily supply power from the backup power circuit to the inverter. Since a part of the power required by the inverter during a period of acceleration of motor speed is supplemented, the inverter can fully drive the motor with the help of the supplemented power, so that the follow-up performance of the motor can be enhanced, while achieving size reduction and suppressing the occurrence of power loss.

DETAILED DESCRIPTION OF THE PREFERRED EMBODIMENTS

Referring to FIGS. 1 to 7, hereinafter is described an embodiment of the present invention.

Figure 1:
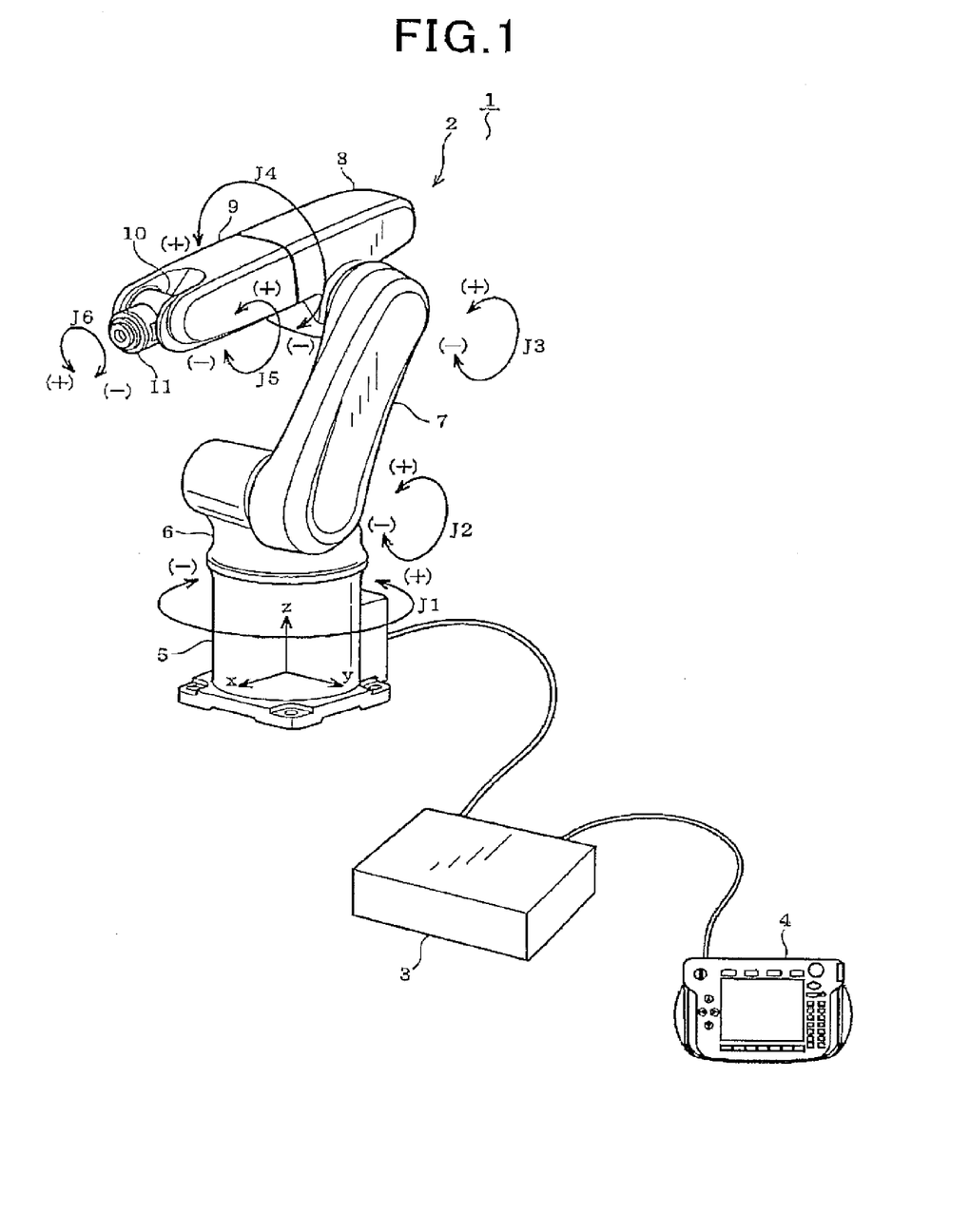
FIG. 1 is a schematic diagram illustrating an appearance of a robot that is a target of control in an embodiment of the present invention.

FIG. 1 illustrates an appearance of a generally used industrial robot system 1 as a target of control in the present embodiment. As shown in FIG. 1, the robot system 1 includes a robot 2, a control unit 3 that controls the robot 2, and a teaching pendant 4 connected to the control unit 3. The teaching pendant 4 may be connected to the control unit 3 only when teaching is carried out, or may be integrally configured with the control unit 3.

The robot 2 is a so-called six-axis vertical articulated robot having a well-known configuration. Specifically, the robot 2 includes a base 5, shoulder 6, lower arm 7, first upper arm 8, second upper arm 9, wrist 10 and flange 11. The shoulder 6 is arranged on the base 5 and connected thereto via a Z-direction first axis (J1) so as to be rotatable in the horizontal direction. The shoulder 6 is connected, via a V-direction second axis (J2), to a lower end of the lower arm 7 extending upward, so as to be rotatable in the vertical direction. The lower arm 7 has a tip end to which the first upper arm 8 is connected via a Y-direction third axis (J3) so as to be rotatable in the vertical direction. The first upper arm 8 has a tip end to which the second upper arm 9 is connected via an X-direction fourth axis (J4) so as to be rotatable in a twisting manner. The second upper arm 9 has a tip end to which the wrist 10 is connected via a Y-direction fifth axis (J5) so as to be rotatable in the vertical direction. To the wrist 10, the flange 11 is connected via an X-direction sixth axis (J6) so as to be rotatable in a twisting manner.

The flange 11 as a tip of the arm of the robot 2 is mounted with an end effector (, which is for example a hand), which is not shown. The end effector is mounted with a jig or a tool, for example, which holds and conveys a work, not shown, or processes or assembles works. The axes (J1 to J6) of the robot 2 are provided with respective electric motors 30 (see FIG. 2), respective encoders (not shown) for detecting rotational positions of the respective motors 30, respective deceleration mechanisms (not shown) for decelerating the output of the respective motors 30, and the like.

Figure 2:
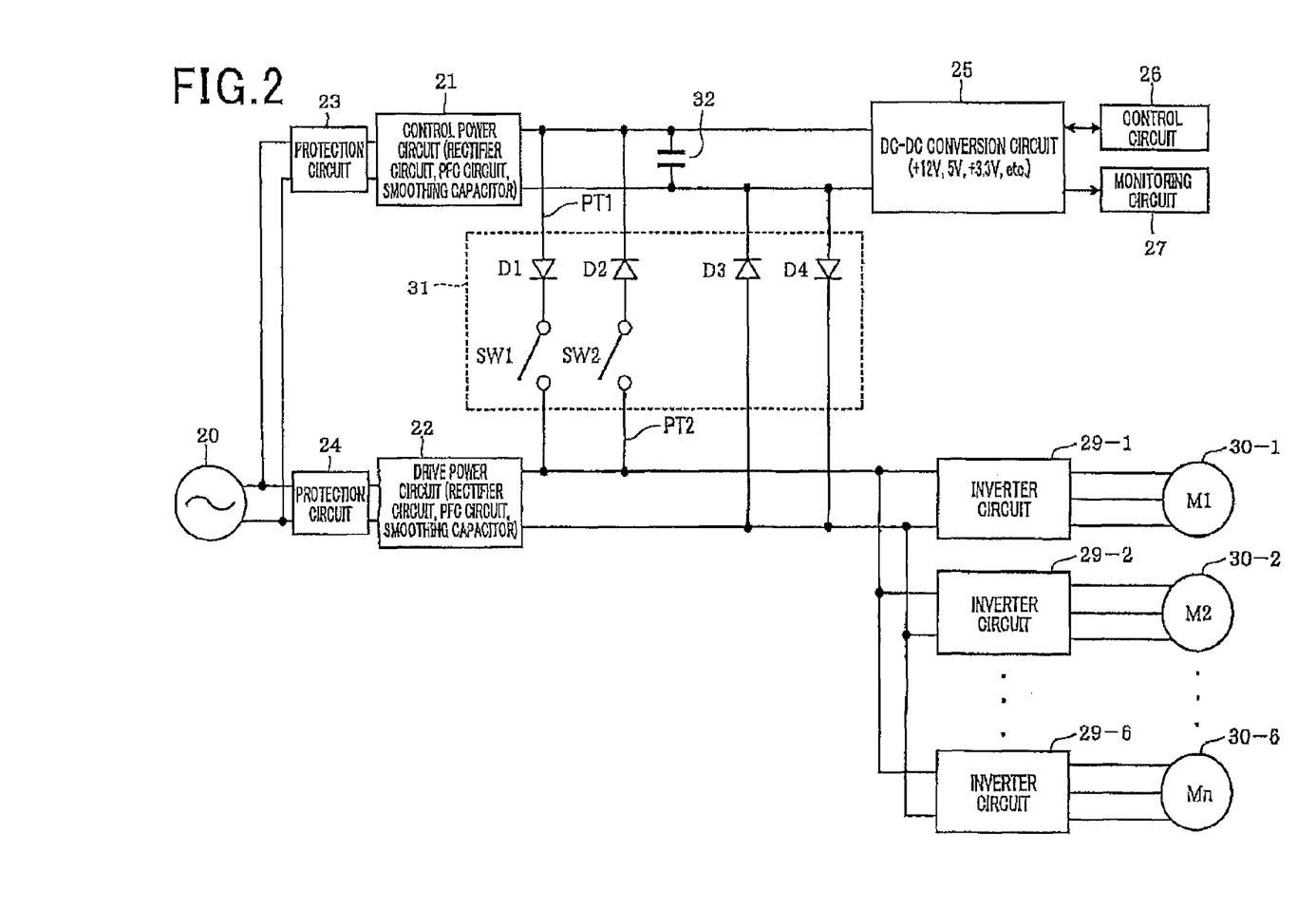
FIG. 2 is a schematic diagram illustrating a configuration of a control unit, according to the embodiment.

FIG. 2 illustrates a configuration of the control unit 3. As shown in FIG. 2, the control unit 3 includes a control power circuit 21 and a drive power circuit 22. The control power circuit 21 converts alternating-current power supplied from a commercial power source 20 into direct-current power. The control power circuit 21 and the drive power circuit 22 each include a well-known rectifier circuit, a power factor correction circuit (PFC circuit) and a smoothing capacitor to thereby supply direct-current power (hereinafter just referred to as "power"). The control power circuit 21 and the drive power circuit 22 are provided, near the commercial power source 20, with protection circuits 23 and 24, respectively. These protection circuits 23 and 24 each have a well-known configuration that includes a fuse, a noise filter and the like.

The control unit 3 also includes a DC-DC converter 25, a control circuit 26 and a monitoring circuit 27. The power supplied from the control power circuit 21 is inputted to the DC-DC converter 25 for conversion into power of +12 V, +5 V, +3.3 V or the like for use in the control circuit 26 or the monitoring circuit 27. The control circuit 26 is configured by a microcomputer, not shown, to fully control the control unit 3. Further, the control circuit 26 executes a control program for controlling the robot 2. The monitoring circuit 27 monitors power in the control unit 3 (e.g., monitoring of the voltage of the commercial power source 20, control of the PFC circuits, or monitoring of the voltage outputted from the DC-DC converter 25).

The control unit 3 also includes inverter circuits 29 and motors 30. The power supplied from the drive power circuit 22 is inputted to the inverter circuits 29. The inverter circuits 29 are each configured by a well-known three-phase bridge circuit to drive the respective motors 30 Since the present embodiment provides an example of the six-axis robot 2 as mentioned above, six inverter circuits 29-1, 29-2, 29-3, 29-4, 29-5 and 29-6 are provided. The inverter circuits 29-1, 29-2, 29-3, 29-4, 29-5 and 29-6 are connected to motors 30-1, 30-2, 30-3, 30-4, 30-5 and 30-6, respectively.

The control unit 3 also includes a switch circuit 31 which is provided between the control power circuit 21 and the drive power circuit 22. The switch circuit 31 includes a switch SW1 (corresponding to the first switch) and a switch SW2 (corresponding to the second switch) which are both configured by a mechanical relay, and includes diodes D1, D2, D3 and D4 for protection. As a matter of course, the switch circuit 31 also includes a filter circuit, although not shown, for preventing the occurrence of chattering caused when the switches SW1 and SW2 are opened/closed.

The switch SW1 (a first switch) is arranged in a path PT1 electrically connecting the control power circuit 21 and the drive power circuit 22 (i.e., electrically connecting the circuits 32 and 29) such that the connection can be opened or closed selectively. The diode D1 is also arranged in the path PT1 and provided to establish a forward direction for current from the control power circuit 21 toward the drive power circuit 22. Accordingly, when the switch SW1 is "closed" (hereinafter referred as "turned on"), the control power circuit 21 and the drive power circuit 22 are connected. Thus, the diode D3 establishes a power line for supplying power from the control power circuit 21. On the other hand, when the switch SW1 is "opened" (hereinafter referred to as "turned off"), the power line from the control power circuit 21 to the drive power circuit 22 is shut down or interrupted.

The switch SW2 (a second switch) is arranged in a further path PT2 electrically connecting the control power circuit 21 and the drive power circuit 22 (i.e., electrically connecting the circuits 32 and 29) such that the connection can be opened or closed selectively. The diode D2 is also arranged in the path PT2 and provided to establish a direction different from the one established by the diode D1, i.e. establishes a forward direction for current from the drive power circuit 22 toward the control power circuit 21. Therefore, when the switch SW2 is turned on, the drive power circuit 22 and the control power circuit 21 are connected to each other to establish a power line, via the diode D4, for supplying power from the drive power circuit 22. On the other hand, when the switch SW2 is turned off, the power line from the drive power circuit 22 to the control power circuit 21 is shut down or interrupted.

The control unit 3 also includes a backup power circuit 32 which is provided between the control power circuit 21 and the DC-DC converter circuit 25. In the present embodiment, the backup power circuit 32 is configured by a capacitor. The backup power circuit 32 is constantly charged. Accordingly, when the supply of power from the control power circuit 21 is shut down or interrupted, the backup power circuit 32 supplies backup power toward the DC-DC converter circuit 25 (i.e. to control circuit 26).

In a state where the switch SW1 of the switch circuit 31 is turned on (and the switch SW2 is turned off), the backup power circuit 32 can supply (i.e., supplement) power, which has been supplied to itself, toward the drive power circuit 22, i.e. to the inverter circuits 29. In a state where the switch SW2 of the switch circuit 31 is turned on (and the switch SW1 is turned off), the backup power circuit 32 can be charged by the drive power circuit 22.

An operation based on the foregoing configuration is described to below.

Figure 3:
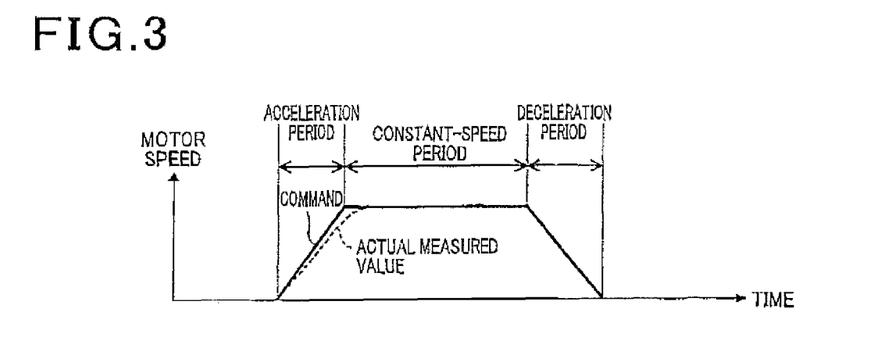
FIG. 3 is a schematic diagram illustrating a relationship between speed command and actual motor speed.
Figure 4:
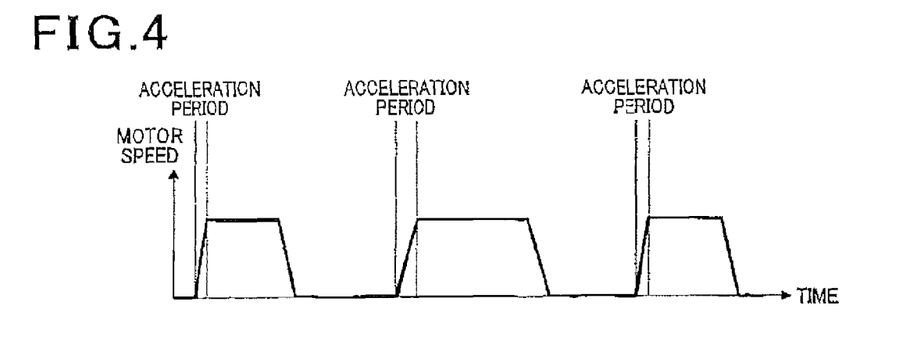
FIG. 4 is a schematic diagram illustrating a control cycle of a motor.

First, referring to FIGS. 3 and 4, a normal control cycle in driving the motor 30 is explained. FIG. 3 illustrates a relationship between speed command and actual motor speed. FIG. 4 illustrates a control cycle of each motor 30. As shown in FIG. 3, when each motor 30 is driven, acceleration of the motor 30 is started on the basis of a command (speed command) from the control circuit 26. The period when the motor 30 is accelerated corresponds to the acceleration period. After that, the motor 30 is driven at a constant speed during a predetermined constant-speed period and then decelerated and stopped. The period when the motor 30 is decelerated corresponds to the deceleration period. As mentioned in the foregoing background art, the actual speed (actual measured value) of the motor 30 in the acceleration period slightly is different from (i.e, is lower than) the speed command value.

The commercial robot 2 is normally used in such a way that a motion set in advance is repeatedly performed. Accordingly, as shown in FIG. 4, a plurality of control cycles are repeated. In this case, the robot 2 moves, e.g. waits until a work is conveyed to a predetermined position, in cooperation with peripheral devices. Therefore, there is a period when the motor 30 is not driven. As will be understood from FIGS. 3 and 4, the proportion of the acceleration period is comparatively small in the period when the robot 2 is enabled to move (i.e. power supply period when the robot 2 is supplied with power).

The drive power circuit 22 can have a large capacity in order to supplementarily supply power the difference (i.e., departure) of the actual speed from a speed command value during the acceleration period. However, providing a large capacity to the drive power circuit 22 may lead to the increase in the size of circuit parts to be used and thus leads to increase in the size of the control unit 3. In addition, having such a large capacity, the drive power circuit 22 may increase power consumption in itself. Accordingly, power is constantly consumed in most of the power supply period, but for the acceleration period, and thus large power loss is caused.

In this regard, as will be described below, the control unit 3 turns on the switch SW1 of the switch circuit 31 in the acceleration period, while turning off the switch SW2, establishes a power line for supplying the power that has been charged to the backup power circuit 32 to the inverter circuits 29, and steps up the voltage applied to the inverter circuits 29. Thus, high torque is generated in the individual motors 30 in the acceleration period. Further, the control unit 3 determines the time (timing) of controlling the switch circuit 31 by analyzing the control program.

Figure 5:
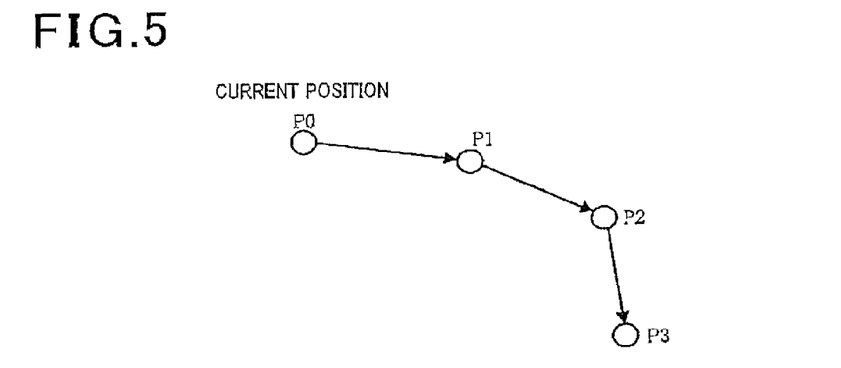
FIG. 5 is a schematic diagram illustrating movement of an arm.
Figure 6:
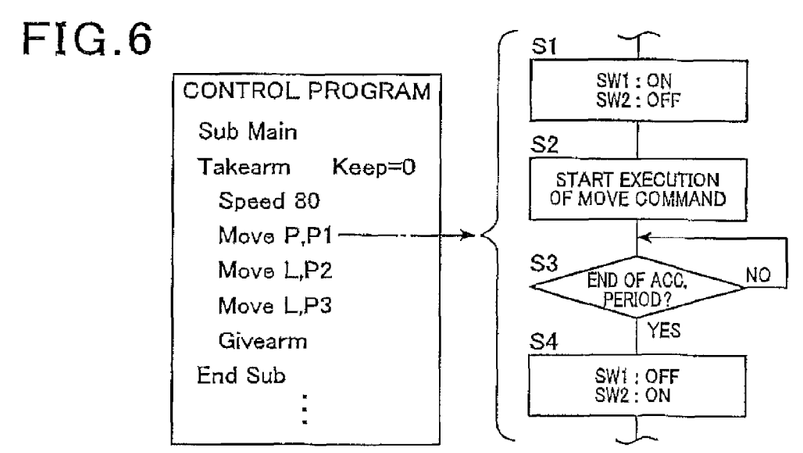
FIG. 6 is a diagram illustrating an example of a control program for controlling a motor.

The control circuit 26 executes the control program for controlling the motors 30. FIG. 5 illustrates a movement of the arm of the robot 2. FIG. 6 illustrates an example of the control program. In FIG. 5, a reference P0 indicates a current position (or initial position) of the end effector of the robot 2. For example, in a control cycle, the end effector is moved to a position P1 from the position P0 and then moved to a position P2 and then further moved to a position P3. In this case, for example, the control program is described as shown in FIG. 6. FIG. 6 shows one subroutine of the control program, in which the commands have the following meaning. The commands shown in FIG. 6 are only examples. Depending on the makers of robots, the names of commands or the grammar may be different.

Sub Main: Declare main procedure
Takearm Keep=0: Acquire arm control right
Speed 80: Set arm-moving speed to 80%
Move P,P1: Move to P1 with PTP interpolation
Move L,P2: Move to P2 with CP interpolation (in straight line)
Move L,P3: Move to P3 with CP interpolation (in straight line)
Givearm: Release arm control right
End Sub: Declare stop (end) of subroutine In the subroutine of the control program, the PTP (point to point) interpolation, which is indicated by P, refers to a command that controls movement duration to be a minimum in a movement from a current position to the subsequent position. Further, the CP (continuous path) interpolation, which is indicated by L, refers to a command for achieving a linear movement from a current position to the subsequent position, constantly retaining the posture and speed of the end effector. Other than the above, commands include a command for achieving an arc-like movement with CP interpolation and a command for achieving a movement smoothly connecting specified path points midway in the movement.

The control circuit 26 analyzes (or interprets) the control program as described above, while controlling the position of the end effector, i.e. controlling the motors 30. In other words, through the analysis (or interpretation) of the control program, the control circuit 26 is able to obtain a timing and a specific motor 30 that starts acceleration at the timing. In this regard, the control circuit 26 uses the control program as a basis to determine the timing of controlling the switch SW1 or SW2 of the switch circuit 31 during the acceleration period. Hereinafter, for the sake of convenience, a state where the switch SW1 is turned on and the switch SW2 is turned off is referred to as an "on-state (supplemented state)", and a state where the switch SW1 is turned off and the switch SW2 is turned on is referred to as an "off-state (charged state)".

Figure 7:
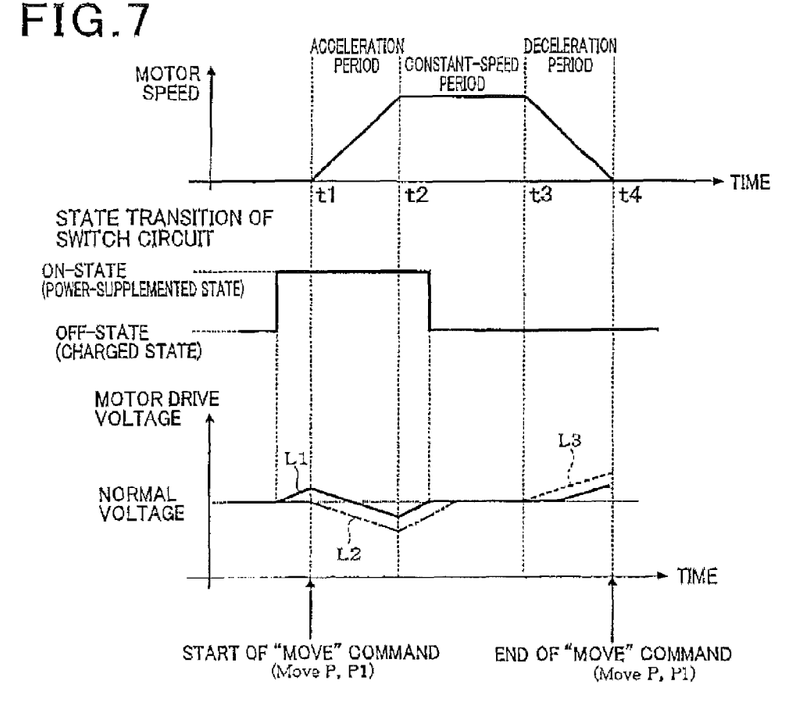
FIG. 7 is a schematic diagram illustrating an example of a to relationship between speed command, control state of a switch circuit and motor drive voltage.

FIG. 7 illustrates an example of a relationship between speed command, control state of the switch circuit 31 and motor drive voltage. As shown in FIG. 7, the control circuit 26 analyzes (interprets) the control program and detects execution of the move command (e.g., command corresponding to "Move P,P1" of FIG. 6). The control circuit 26 can obtain a trapezoidal speed pattern by analyzing a "Move" command. This trapezoidal speed pattern is defined by timings t1, t2, t3 and t4, where a period of t1-t2 is an acceleration period and a period of t3-t4 is a deceleration period, and acceleration and deceleration speeds are predetermined.

Before starting execution of the move command, the control circuit 26 brings the switch circuit 31 into on-state (refer to step S1 in FIG. 6). Thus, the switch SW1 of the switch circuit 31 is turned on, while the switch SW2 is turned off to thereby establish the power line for supplementarily supplying power to the inverter circuits 29 from the backup power circuit 32. In this case, motor drive voltage (voltage applied to each of the inverter circuits 29) becomes higher than the normal voltage as indicated by the solid line L1.

Then, when the execution of the move command is started (refer to step S2 in FIG. 6), each motor 30 starts acceleration and power is fed to each inverter circuit 29. In this case, as a comparative example, when the control unit 3 is not provided with the switch circuit 31 as in the configuration based on conventional art, voltage drop as indicated by the dash-dot-dot line L2 is observed. On the other hand, in the control unit 3 provided with the switch circuit 31, a voltage indicated by the solid line L1, which is higher than the voltage indicated by the dash-dot-dot line L2, is applied to the inverter circuits 29. In other words, comparing with the configuration based on conventional art, power that corresponds to an area between the solid line L1 and the dash-dot-dot line L2 is supplied to the inverter circuits 29 in the control unit 3 of the present embodiment. Thus, the torque during the acceleration period is increased. Accordingly, the motors 30 are each able to achieve acceleration in a state where difference of the actual speed from a command speed is lessened, i.e. in a state where the actual speed follows up the command speed. Improvement in the follow-up performance with respect to a command speed means that the time before reaching a target speed is shortened. As a result, the control cycle is shortened.

After expiration of the acceleration period (refer to step S3 in FIG. 6), the control circuit 26 brings the switch circuit 31 into the off-state (charged state) (refer to step S4 in FIG. 6). More precisely, the control circuit 26 brings the switch circuit 31 into off-state prior to the deceleration period. In this instance, the switch SW1 of the switch circuit 31 is turned off and the switch SW2 is turned on to thereby establish a power line from the inverter circuits 29 to the backup power circuit 32.

When the motors 30 are each decelerated, regenerative power is generated. Since the power line from the inverter circuits 29 to the backup power circuit 32 has been established, the regenerative power during the deceleration period can be used for charging the backup power circuit 32. Specifically, the backup power circuit 32 that has supplementarily supplied power during the acceleration period can be re-charged with the regenerative power during the deceleration period.

Therefore, in the configuration based on conventional art that is not provided with the switch circuit 31 as a comparative example, the motor drive voltage is merely increased as indicated by the broken line L3. In this regard, in the control unit 3 of the present embodiment, the increase of the motor drive voltage is suppressed as indicated by the solid line L1. In this case, power that corresponds to the area between the broken line L3 and the solid line L1 is charged into the backup power circuit 32.

As described above, in the control unit 3 of the present embodiment, the power is supplementarily supplied to the inverter circuits 29 in the acceleration period when the motors 30 are accelerated to increase the torque of the motors 30. On the other hand, the backup power circuit 32 is charged with regenerative power during the deceleration period when the motors 30 are decelerated.

The foregoing embodiment can provide the advantageous effects as provided below.

When the motors 30 are accelerated, the control unit 3 turns on the switch SW1 (first switch) of the switch circuit 31 to establish a power line between the backup power circuit 32 and the inverter circuits 29. Thus, during the acceleration period for accelerating the motors 30, the power stored in the backup power circuit 32 is available for driving the motor 30. Thus, the motors 30 can exert high torque and enhance their follow-up performance.

In this case, since the power is supplementarily supplied from the backup power circuit 32, the drive power supply 22 is not required to have a large capacity. Accordingly, the size of the control unit 3 is not increased more than necessary, which would otherwise have been increased due to the increase in the size of the circuit parts. Thus, constantly, the occurrence of power loss is prevented. In addition, with the enhancement of the follow-up performance of the motors 30, the control cycle can be shortened. In other words, productivity is enhanced by the robot 2.

Since the acceleration period is short, the power used in this period will not be larger. In addition, since the backup power circuit 32 is configured to be constantly charged, the power used in the acceleration period can be covered by the re-charge after expiration of the acceleration period. Accordingly, holding time that is originally set for backup (period in which backup power can be supplied) will not be shortened.

The state where the switch circuit 31 is under control may be regarded to be a state where the switch circuit 31 as well as the control circuit 26 is normally operated. Therefore, in such a normal operation (non-emergent state), the original function of the backup power circuit 32 has a low probability of being impaired by the temporary use of the power stored in the backup power circuit 32.

The control unit 3 turns off the switch SW1 when the motors 30 are decelerated to disable the supplement of power for the inverter circuits 29. On the other hand, in this case, the control unit 3 turns on the switch SW2 (second switch) to establish a power line from the inverter circuits 29 to the backup power circuit 32. Thus, regenerative power generated on the inverter circuits 29 side can be charged to the backup power circuit 32. In other words, the regenerative power that has been emitted without being used in conventional art can be effectively used.

In this case, the power supplemented in the acceleration period is recovered in the deceleration period. Therefore, compared to the case where the backup power circuit 32 is charged by the control power circuit 21, power consumption is reduced when the control unit 3 as a whole is concerned.

Further, the control unit 3 analyzes the control program incorporated in advance for the control of the motors 30. Based on the analysis, the control unit 3 turns on the switch SW1 at a time point prior to the start of acceleration of the motors 30. Thus, by the time when the motors 30 start acceleration, the backup power circuit 32 is ready to supplement power. Therefore, the power can be supplemented throughout the acceleration period for accelerating the motors 30. Thus, the follow-up performance of the motors 30 is enhanced.

The backup power circuit 32 is configured not to store excess power, such as regenerative power, but to be constantly charged with power for the backup of the control circuit 26. Specifically, whenever the switch SW1 is turned on, the backup power circuit 32 can timely supplementarily supply power. Accordingly, the backup power circuit 32 is able to reliably and appropriately supplement power at the timing when torque is required.

In this case, in the configuration in which the timing of turning on the switch SW1 is determined on the basis of an analysis of the control program as mentioned above, it is not necessary to wait until the backup power circuit 32 is charged. Accordingly, the control cycle of the robot 2 is prevented from being delayed and thus productivity is prevented from being impaired. In addition, there is no need of performing a process such as of confirming the residual amount of power of the backup power circuit 32. Accordingly, the control program is prevented from being complicated.

Further, through the analysis of the control program, the timing for the motors 30 to start acceleration is grasped in advance. Accordingly, the switch SW1 can be turned on prior to the acceleration of the motors 30 in the case where, as in the present embodiment, the switch SW1 is configured by a mechanical relay which requires some time before chattering at the turning on/off is eliminated.

Since the switches SW1 and SW2 are each configured by a mechanical relay, the size of the control unit 3 is reduced compared to the case where the switches are each provided with a booster circuit that is configured by a FET (field-effect transistor) or a coil. Also, control is performed by only turning on/off the mechanical relays and thus the processing load will not be greatly increased.

The control power circuit 21 may have a failure immediately after power as supplement has been supplied from the backup power circuit 32. However, such a failure is rarely caused, or the probability of inviting such a failure is quite low, because the proportion of the acceleration period is small, as mentioned above, in terms of the operation period of the robot. Therefore, when the rarely caused failure is compared with the enhancement of follow-up performance, the benefits arising from the enhancement of follow-up performance would be greater.

As mentioned above, the period in which the backup power circuit 32 is charged with power (period excluding the acceleration period) is longer than the period in which the backup power circuit 32 supplementarily supply power (acceleration period). Accordingly, there is a low probability that the backup power circuit 32 completely discharges power and causes unforeseen failure.

Other Embodiments

The present invention is not limited to the embodiment described above but may be modified or extended as follows.

Figure 8:
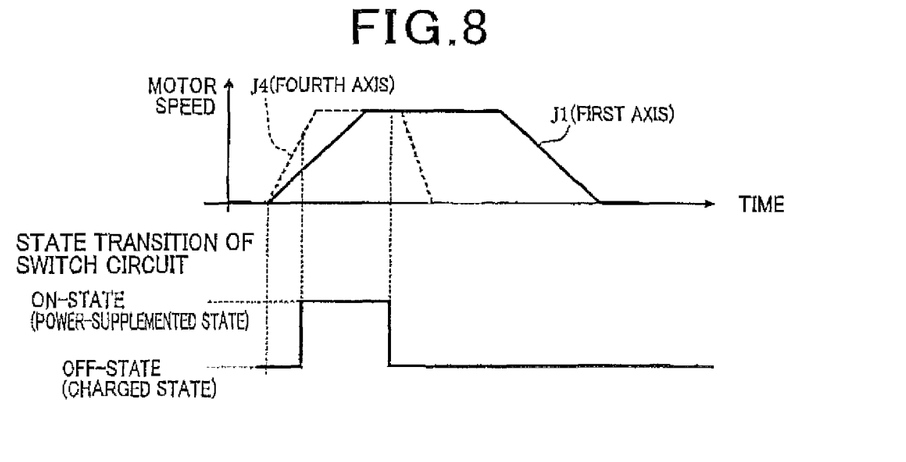
FIG. 8 is a schematic diagram illustrating an example of a relationship between speed command and control state of a switch circuit, according to another embodiment.

A six-axis robot in general is provided with six motors 30 and six inverter circuits 29 and a single drive power circuit 22, as shown in FIG. 2. In the case of the robot 2, the control program is described with reference to the position of the end effector. Therefore, for example, when the end effector is moved from the point P0 to the point P1 as shown in FIG. 5, the motors 30 corresponding to J4 (fourth axis) and J1 (first axis), for example, may concurrently start acceleration as shown in FIG. 8. In this case, these motors 30, after starting acceleration, are fed with power from the drive power circuit 22. Therefore, when the switch circuit 31 is brought to an on-state before the start of acceleration, these motors 30 will individually consume power. In other words, when a plurality of motors 30 concurrently start acceleration, it is difficult to supplement power only for a specific motor 30. Further, the effect of enhancing follow-up performance with the supplement of power may be different between the motor 30 that corresponds to J1 for driving the whole arm of the robot 2 and the motor 30 that corresponds to J4.

In this regard, the control unit 3 may analyze the control program to turn on the first switch at the timing when power is mainly supplemented for a motor 30 that is a target of supplementary power supply. Specifically, as shown in FIG. 8, the switch circuit 31 may be brought into an on-state after the motor 30 that corresponds to J4 has started acceleration to thereby ensure that supplementarily supplied power is mainly used for the motor 30 that corresponds to J1. In this way, a motor 30 as a target of supplementary power supply may be selected and then the switch SW1 may be turned on at the timing when power is mainly supplemented for the selected motor 30. Thus, the follow-up performance of the selected motor 30 is enhanced by the supplementarily supplied power.

In this case, which of the motors 30 should be selected as a target of power supplement may be determined according to the output of the motors 30, the duration of the acceleration period, and the like. For example, when the output of a motor 30 is large, the torque required by the motor 30 would also be large. Therefore, among the motors 30 that concurrently start acceleration, the one having the largest output may be selected as a target of power supplement. When the output is of the same level between the motors 30, the motor 30 having longer acceleration period may be selected as a target of power supplement.

In the foregoing embodiment, a six-axis robot is exemplified. However, for example, the present invention may be applied to robots with a different number of axes, such as a single-axis robot, a four-axis robot or a seven-axis robot.

In the foregoing embodiment, each switch is configured by a mechanical relay. However, alternative to the mechanical switch, the switch may be configured by a semiconductor switch, such as FET (field-effect transistor).

The foregoing embodiment exemplifies that the switch SW1 is turned on before the start of acceleration. However, since the difference of the actual torque from a command value may become larger at the end of the acceleration period, the timing of turning on the switch SW1 may be determined so that power is particularly supplemented at the end of the acceleration period. A time instant to start supplementarily supplying power can be determined by the control circuit 26 through analyzing a move command or on a predetermined default scheme.

The present invention may be embodied in several other forms without departing from the spirit thereof. The embodiment and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A control unit for a robot, comprising:
an inverter which drives a motor installed in a robot;
a control circuit that generates a command to control, via the inverter, drive of the motor, the drive of the motor including acceleration and deceleration of the motor;
a drive power circuit which converts AC (alternating-current) power to DC (direct-current) power and supplies the converted DC power to the motor;
a control power circuit which converts AC power to DC power and supplies the converted DC power to the control circuit;
a backup power circuit which supplies backup DC power to the control circuit when the DC power from the control power circuit to the control circuit is shut down, wherein the backup power circuit is charged continuously, at least, before the DC power to the control circuit is shut down; and
a switch circuit provided with a first switch and a second switch, the first switch being arranged in a path electrically connecting the backup power circuit and the inverter, the second switch being arranged in a path electrically connecting the drive power circuit and the backup drive circuit, each of the first switch and the second switch being selectively switched on and off to open and close,
wherein the control circuit comprises a first switch control section and a second switch control section, the first switch control section switching on the first switch to close the path such that the DC power in the backup power circuit is supplementarily supplied to the inverter when the motor is driven to be accelerated in response to the command from the control circuit, and the second switch control section switching off the first switch such that the DC power to the inverter is disenabled and switching on the second switch such that regenerative power from the inverter is used to charge the backup power circuit when the motor is driven to be decelerated.

2. The control unit of claim 1, wherein the control circuit is configured to analyze a control program to control the drive of the motor, analyzing the control program enabling the first switch control section to know a drive pattern of the motor, and the first switch control closes the first switch according to the drive pattern before start of the acceleration of the motor.

3. The control unit of claim 2, wherein the motor is composed of a plurality of electric motors respectively arranged at joints of the robot and the inverter is composed of a plurality of inverters driving the respective motors, and the control circuit is configured to analyze a control program to control the drive of the motors, analyzing the control program enabling the first switch control section to know a designated motor which is subjected to the power supply from the backup power circuit and a drive pattern of the designated motor, and the first switch control closes the first switch according to the drive pattern before start of the acceleration of the designated motor.

4. The control unit of claim 1, comprising a path electrically connecting the control power circuit and a DC-DC conversion circuit supplying DC power to the control circuit, wherein the backup power circuit is arranged in the path connecting the control power circuit and the DC-DC conversion circuit such that the backup power circuit is charged continuously by the power supplied from the control power circuit to the DC-DC conversion circuit.

5. The control unit of claim 1, comprising a path electrically connecting the control power circuit and a DC-DC conversion circuit supplying DC power to the control circuit, wherein the backup power circuit is arranged in the path connecting the control power circuit and the DC-DC conversion circuit such that the backup power circuit is charged continuously by the power supplied from the control power circuit to the DC-DC conversion circuit.

6. The control unit of claim 5, wherein each of the first and second switches has ends, one end of which being electrically connected to the path connecting the control power circuit and the DC-DC conversion circuit, the other end of which being electrically connected to a path electrically connecting the drive power circuit to the inverter.

7. The control unit of claim 2, comprising a path electrically connecting the control power circuit and a DC-DC conversion circuit supplying DC power to the control circuit, wherein the backup power circuit is arranged in the path connecting the control power circuit and the DC-DC conversion circuit such that the backup power circuit is charged continuously by the power supplied from the control power circuit to the DC-DC conversion circuit.

8. The control unit of claim 7, wherein each of the first and second switches has ends, one end of which being electrically connected to the path connecting the control power circuit and the DC-DC conversion circuit, the other end of which being electrically connected to a path electrically connecting the drive power circuit to the inverter.

9. The control unit of claim 3, comprising a path electrically connecting the control power circuit and a DC-DC conversion circuit supplying DC power to the control circuit, wherein the backup power circuit is arranged in the path connecting the control power circuit and the DC-DC conversion circuit such that the backup power circuit is charged continuously by the power supplied from the control power circuit to the DC-DC conversion circuit.

10. The control unit of claim 9, wherein each of the first and second switches has ends, one end of which being electrically connected to the path connecting the control power circuit and the DC-DC conversion circuit, the other end of which being electrically connected to a path electrically connecting the drive power circuit to the inverter.

* * * * *